US005488790A

United States Patent [19]
Blauer

[11] Patent Number: 5,488,790
[45] Date of Patent: Feb. 6, 1996

[54] AUTOMOBILE LICENSE PLATE FRAME

[75] Inventor: Darrell W. Blauer, Orono, Minn.

[73] Assignee: Douglas Corporation, Eden Prairie, Minn.

[21] Appl. No.: 479,818

[22] Filed: Jun. 7, 1995

Related U.S. Application Data

[63] Continuation of Ser. No. 314,526, Sep. 28, 1994, abandoned, which is a continuation of Ser. No. 98,622, Jul. 28, 1993, abandoned.

[51] Int. Cl.⁶ .................................................... G09F 7/00
[52] U.S. Cl. ............................................................ 40/209
[58] Field of Search ............................. 40/200, 209, 210, 40/653, 658

[56] References Cited

U.S. PATENT DOCUMENTS

| D. 175,144 | 7/1955 | Audette | 40/209 X |
|---|---|---|---|
| 361,987 | 4/1887 | Clark | 40/668 X |
| 558,365 | 4/1896 | Duggan | 40/668 |
| 1,410,662 | 3/1922 | Even | 40/209 |
| 1,660,575 | 2/1928 | Overton | 40/209 |
| 4,011,675 | 3/1977 | Herring | 40/209 |

*Primary Examiner*—Brian K. Green
*Assistant Examiner*—Joanne Silbermann
*Attorney, Agent, or Firm*—Merchant, Gould, Smith, Edell, Welter & Schmidt

[57] ABSTRACT

A frame for a license plate includes top, bottom and side edges which are joined together and have a maximum size such that an outer perimeter of the frame is substantially coextensive with the license periphery. The license plate and frame are joined together to form an assembly which can be received in any recess or other area on an automobile which is sized to receive the license plate.

3 Claims, 3 Drawing Sheets

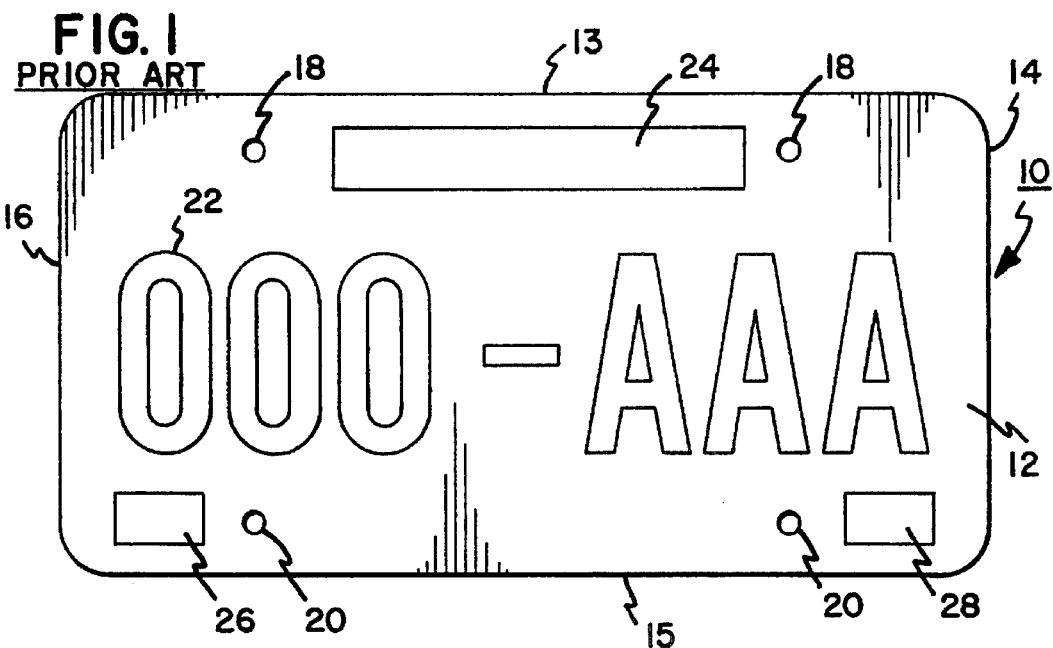
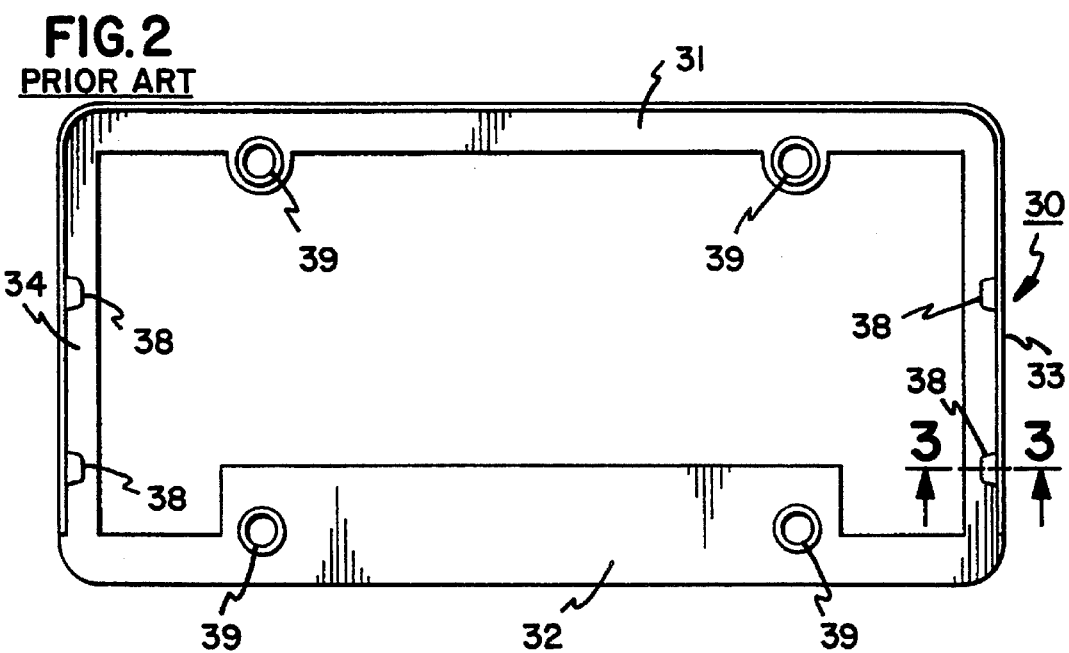
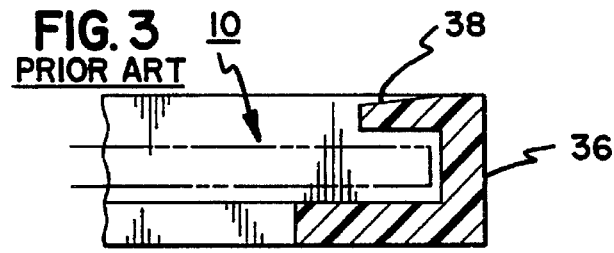

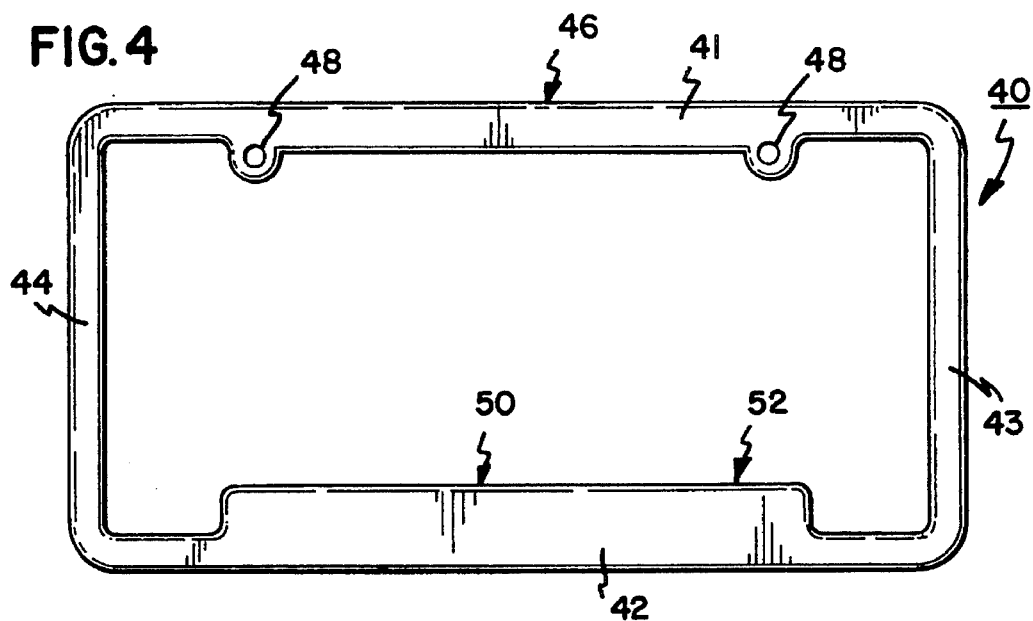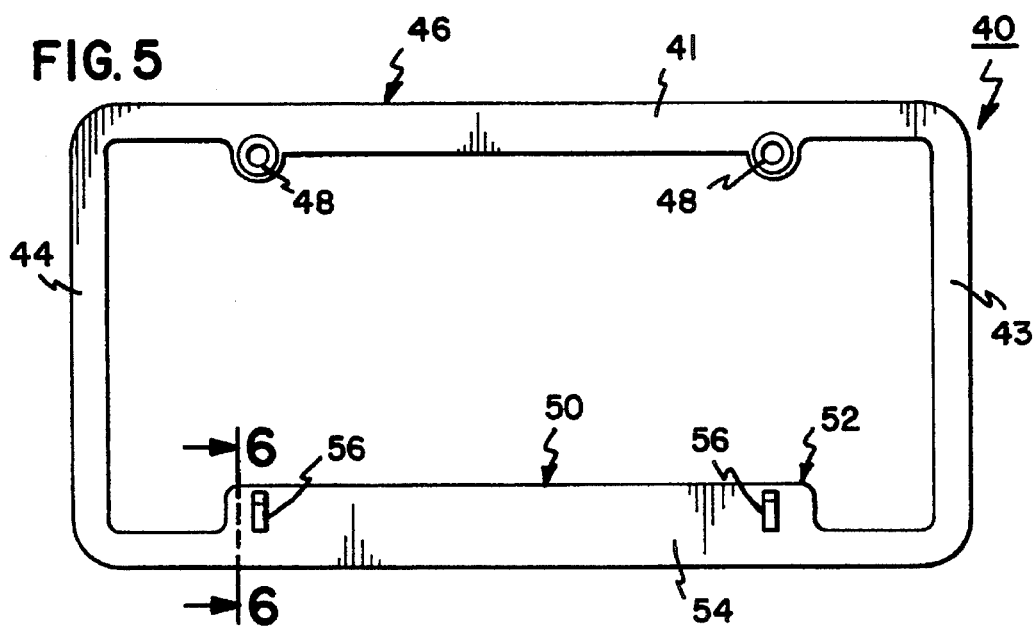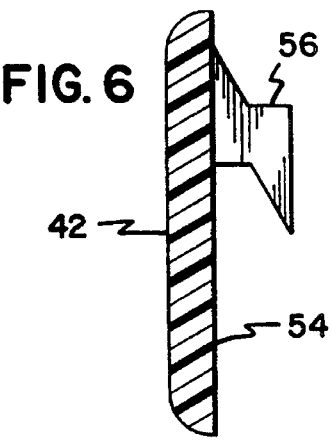

či5,488,790

AUTOMOBILE LICENSE PLATE FRAME

This is a continuation of application Ser. No. 08/314,526, filed Sep. 28, 1994, now abandoned, which is a continuation of application Ser. No. 08/098,622, filed Jul. 28, 1993, now abandoned.

BACKGROUND OF THE INVENTION

1. Field of the Invention

This invention pertains to a frame for an automobile license plate. Such frames may be plastic, metal or other suitable material

2. Description of the Prior Art

In the United States, automobile license plates are of a standardized construction. The plates are generally rectangular with predetermined external dimensions. Standardized construction of the automobile license plate also includes standardized locations for placement of mounting holes formed through the license plate. The standardized mounting holes include two mounting holes positioned adjacent an upper edge of the plate in predetermined locations and a pair of lower mounting holes positioned adjacent the lower edge of the plate in predetermined positions.

Within the various states, state regulatory agencies (for example, a state department of transportation) will regulate the type and location of information which is required to appear on the face of the plate. For example, a state may require that an identifying number be positioned in a certain location on the face of the plate and that other information such as issuance stickers and state names be located on other surfaces of the face of the plate. Such information must be visible when the plate is secured to an automobile.

With the benefit of a standardized construction of license plates with respect to external dimensions and positioning of mounting holes, automobile manufacturers construct automobiles for U.S. markets with locations on the automobiles prepared to accept license plates of the predetermined construction. For example, an automobile manufacturer will provide a location on the bumper of a vehicle with the location sized to receive the license plate and with the location having mounting mechanisms (for example, threaded nuts) positioned to be in alignment with one or more pairs of the license plate mounting holes when the license plate is placed against the bumper area in overlying relation. Commonly, vehicles manufactured for the U.S. market only secure the license plate to the vehicle through the upper mounting holes even though the lower pair of mounting holes is made available on the license plate.

For some time, license plate frames have been very popular. A license plate frame surrounds the peripheral edge of the license plate and provides a decorative effect. The frame is sized to cover and surround the peripheral edge with the frame commonly having attachment mechanisms which capture the plate within the frame. The attachment mechanisms of the prior art frames required that the frame extend beyond the peripheral edge of the license plate to provide a wrap-a-round securement to the plate. Such frames would typically be used by automobile dealerships who would secure the frame and plate to the vehicle at the time of purchase with the frame containing the name of the dealership for advertisement purposes. Also, people commonly buy license plate frames to carry a wide variety of messages including University affiliations or other messages.

In recent years, automobile manufacturers have made increasing encroachment on the area in which a license plate is to be attached. Namely, a bumper may be provided with a recessed area into which a license plate is to be attached. If the recessed area is sized such that the license plate can just barely fit, a prior art frame cannot be installed onto the license plate without great difficulty since the frame is sized greater than the license plate. It is an object of the present invention to provide a license plate frame which can be secured to a license plate without increasing the size requirements for the license plate attachment area.

II. SUMMARY OF THE INVENTION

According to a preferred embodiment of the present invention, a frame is provided for a license plate. The license plate includes a generally planar, rectangular body having a periphery of predetermined dimensions. The plate also includes first and second pairs of mounting holes formed through adjacent upper and lower edges of the periphery. The frame comprises top and bottom edges joined in spaced apart relation by first and second spaced apart side edges. The top, bottom and first and second side edges of the frame define an outer frame perimeter. The edges are sized for the outer frame perimeter to be substantially coextensive with the license plate periphery when the frame is placed against the plate in overlying relation. The top edge of the frame includes a first pair of frame holes formed through the top edge. The frame holes are disposed to align with the first pair of mounting holes when the frame and the plate are in the overlying relation.

III. BRIEF DESCRIPTION OF THE DRAWINGS

FIG. 1 is a front elevation view of a standard license plate for an automobile;

FIG. 2 is a rear elevation view of a prior art frame for securing to a license plate such as that shown in FIG. 1;

FIG. 3 is a view taken along lines 3—3 of FIG. 2;

FIG. 4 is a front elevation view of a license plate frame according to the present invention;

FIG. 5 is a rear elevation view of the frame of FIG. 4;

FIG. 6 is a view taken along line 6—6 of FIG. 5;

IV. DESCRIPTION OF THE PREFERRED EMBODIMENT

Figure 7:
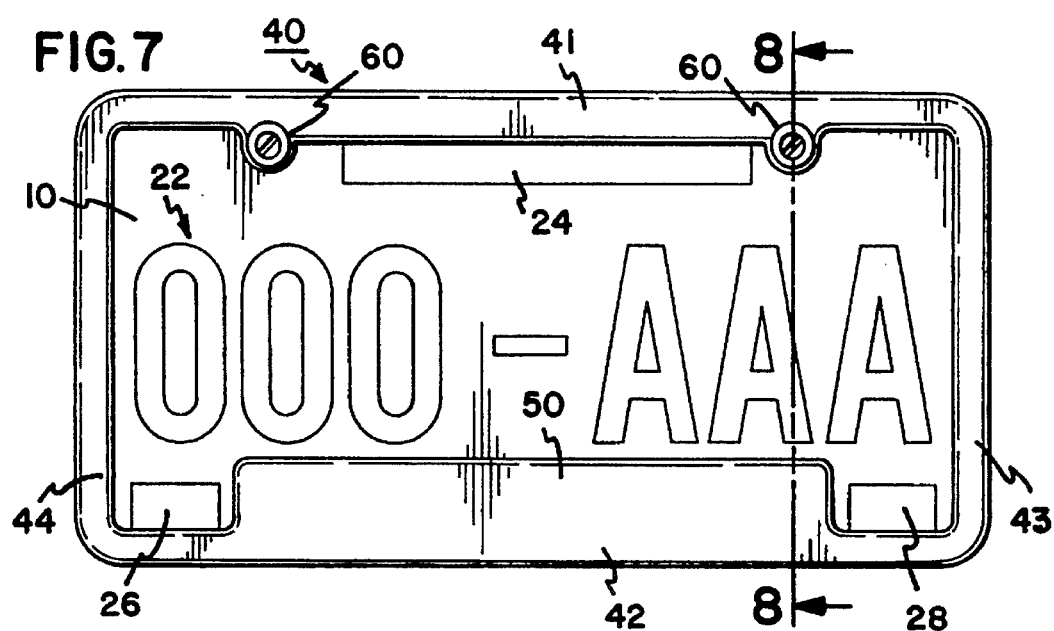
FIG. 7 is front elevation view of a frame of the present invention secured to a plate such as that shown in FIG. 1.

Referring now to the several drawing figures in which identical elements are numbered identically throughout, a description of the preferred embodiment will now be provided.

FIG. 1 shows a standardized automobile license plate 10. The plate 10 includes a sheet metal body 12 having a top edge 13 and a spaced apart bottom edge 15. Joining the top edge 13 and the bottom edge 15 are side edges 14,16. It is recognized in the industry that the license plate 10 is of standardized construction such that the periphery defined by edges 13–16 is of predetermined size and shape. The plate 10 also includes a first pair 18 of mounting holes positioned adjacent the top edge 13. A second pair 20 of mounting holes is positioned adjacent the bottom edge 15. Again, as recognized in the industry, the number and location of mounting holes 18,20 is predetermined by industry standards.

While the size and shape of the license plate is standard throughout the United States, the location and nature of information exposed on the license plate 10 is subject to state regulatory authorities (such as state departments of transportation). The information contained on a license plate will commonly include a license plate number 22 which is typically stamped into the sheet metal body 12 and centrally positioned on the face of the body 12. The face of the body 12 will also include a plurality of other fields of information. For example, the face may include a field 24 for containing the name of the state issuing the license plate. The plate 10 may also include fields 26,28 for positioning stickers indicating the month and year of issuance of the license plate and the date of expiration. Each state authority is uniquely free to locate such fields on face as the state may desire.

FIGS. 2 and 3 illustrate a prior art frame for securing to a plate 10. The prior art frame 30 includes spaced apart top and bottom edges 31,32 joined by spaced apart sides edges 33,34. Extending rearwardly from the edges 31,34 is a flange 36 (best shown in FIG. 3). A license plate 10 (shown in phantom lines in FIG. 3) is sized to be received against the back surface of the edges 31–34. The edges 31–34 are sized to extend beyond the outer periphery of the plate 10 such that the flange 36 protrudes beyond the sides of the license plate 10. Tabs 38 are secured to the flange 36 and protrude beyond the back side of the license plate 10 such that the license plate 10 is captured in the frame between the tabs 38 and the edges of the frame 30. In certain prior art designs, tabs may be positioned at the bottom edge of the frame. The frame 30 is also provided with mounting holes 39 positioned on the frame to be in alignment with the mounting holes 18,20 when the frame is secured to the license plate 10. In the prior art, four mounting holes are frequently, but not always provided. For example, only two such holes may be provided.

With the prior art structure described above, the license plate frame 30 is necessarily larger than the outer periphery dimensions of the license plate 10. Accordingly, in an application where the automobile is provided with a recess sized to accept a license plate 10 in very close tolerance, the enlarged size of the frame 30 cannot be accepted in such a recess without extreme difficulty or, on some automobiles, not all.

With reference now to FIGS. 4–8, a license plate frame 40 according to the present invention is shown and will now be described. The license plate frame 40 consists of four flat edges 41–44 which are not provided with protruding flanges (such as flange 36 in the prior art frame 30). The edges include a top edge 41 and a parallel spaced apart bottom edge 42. Side edges 43,44 are parallel and spaced apart and join edges 41,42. The edges 41–44 define an outer frame perimeter 46 which is sized for the outer frame perimeter 46 to be substantially coextensive with the periphery of the license plate 10. In other words, the perimeter 46 substantially matches the size and shape of the periphery of license plate 10 such that when the frame 40 is placed on the plate 10 in overlying relation, no part of the frame 40 extends beyond the periphery of the license plate 10 (with a tolerance of about p 1/16 to accommodate inconsistent plate sizes.)

The top edge 41 is provided with frame mounting holes 48 formed therethrough and positioned for the holes 48 to be aligned with holes 18 of plate 10 when the frame 40 and the plate 10 are in the overlying relation.

The edges 41–44 of the frame define an inner perimeter 50 which is sized to expose the fields 22, 24, 26, 28 when the frame 40 and the plate 10 are in the overlying relation.

The bottom edge 42 of the frame includes an enlarged area 52. The enlarged area 52 is sized such that it does not protrude into fields required by local authorities. However, the enlargement 52 has the benefit of providing an enlarged surface area for positioning of advertisement or slogans or the like.

On the back side 54 of bottom edge 42, there are provided attachment lugs 56 for securing the bottom edge 42 to the license plate 10.

The lugs 56 are best shown in FIG. 6. The lugs 56 are integrally secured to the bottom edge 42 and project rearwardly and downwardly away from the bottom edge 42. The lugs 56 are positioned and sized to be inserted within holes 20 of license plate 10. As a result, in use, the frame 40 may be placed against a license plate 10 with lugs 56 aligned with holes 20 and with the frame being set at an angle relative to the plate 10. Upon urging the top edge 41 of the frame 40 towards the plate 10, the lugs 56 pass into the holes 20.

Figure 8:
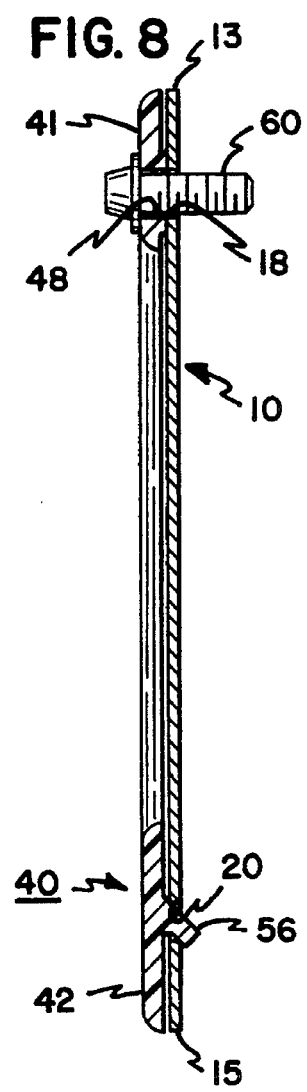
FIG. 8 is a view taken along line 8—8 of FIG. 7.

FIGS. 7 and 8 show a completed assembly of the license plate 10 and the frame 40. As best shown in FIG. 8, the lugs 56 pass through the holes 20 such that the plate 10 is captured between the lugs 56 and the lower edge 42 to prevent relative movement between the lower edge 42 and the bottom edge 15 of the license plate 10.

The holes 48 of the upper edge 41 are aligned with the upper mounting holes 18 of the plate 10 such that a fastening bolt 60 can be passed through the aligned holes 18,48 and inserted into nuts (not shown) positioned on the automobile for receiving the license plate 10.

Having thus described the present invention, the reader will note that the assembled frame 40 and license plate 10 present an exterior dimension no greater than that of the license plate 10. As a result, the assembled frame 40 and license plate 10 can be received in any automobile recess or other area which is sized to receive the license plate 10. Also, the present invention provides for the frame 40 to be securely attached to the license plate 10 to prevent relative movement between the frame 40 and the plate 10 during use. Namely, the lugs 56 securely attach the bottom edge 42 of the frame to the bottom edge 15 of the license plate 10 while the mounting bolt 60 secures the upper edge 41 of the frame to the upper edge 13 of the license plate.

In addition to providing a decorative effect, the frame 40 includes adequate areas (such as enlarged area 52) for receiving advertising, automobile dealership names, slogans, sayings, or the like. Also, the frame 43 exposes all required fields and is readily adaptable to accommodate field differences between various states. An additional advantage of the present invention pertains to the cost of manufacture. Prior art frames (such as frame 30) would be typically made from a molded plastic or cast metal or the like. With respect to molded plastic parts, due to the need to have the return tabs 38, expensive and complicated molds were required. The present invention does not have the return flange 36 or tabs 38 of the prior art and can be manufactured through a less expensive molding process.

Alternatively, embodiments of the invention would eliminate lugs 56 in favor of a second set of mounting holes. Also, FIGS. 4 and 5 show mounting holes 48 on the top edge 41 with lugs 56 on the bottom edge. Alternate embodiments may include the mounting holes on the bottom edge with lugs on the top edge.

From the foregoing detailed description of the present invention, it has been shown how the objects of the invention have been attained in the preferred manner. However, modifications and equivalents other than the disclosed concept such as those which readily occur to one skilled in the art are intended to be included within the scope of the claims which are appended hereto.

What is claimed:

1. In combination, a license plate and a frame for said license plate wherein said license plate includes a generally planar rectangular body having a periphery of predetermined dimensions and having first and second pairs of mounting holes formed therethrough adjacent upper and lower edges of said periphery, said frame comprising first and second longitudinal edges joined in spaced apart relation by first and second spaced apart side edges; said top, bottom and first and second side edges defining an outer frame perimeter, said edges of said frame sized for said outer frame perimeter to be substantially coextensive with said license plate periphery when said frame is placed against said plate in an overlying relation and said frame further sized for said edges of said frame not to extend beyond said outer frame perimeter, said first longitudinal edge including a first pair of frame holes formed therethrough and disposed to align with said first pair of mounting holes when said frame and said plate are in said overlying relation; and attachment means carried on a back side of said frame opposing said plate and including lugs sized and having angled surfaces relative to said frame to be slidably inserted into said second pair of mounting holes without piercing material of said frame as said frame is aligned with said plate with said frame holes aligned with said first pair of mounting holes and with said frame at a non-parallel angle to said plate and said lugs further sized and shaped to be slidable out of said second pair of mounting holes when said frame is angled relative to said plate, said lugs opposing said plate when said frame is aligned with said plate and parallel thereto.

2. A combination according to claim 1 wherein said license plate body includes a field of mandatory information prescribed by an automobile regulatory authority, said first and second longitudinal edges and first and second side edges sized for said frame to present an inner perimeter sized to expose said field through said frame when said frame and said plate are in said overlying relation.

3. A combination according to claim 2 wherein said bottom edge includes an enlarged area sized to cover said second pair of mounting holes when said plate and said frame are in said overlying relation.

* * * * *